United States Patent [19]

Muller et al.

[11] Patent Number: 4,710,229
[45] Date of Patent: Dec. 1, 1987

[54] POWDERED BITUMEN CONCENTRATE AND ITS USE

[75] Inventors: Karl H. Muller, Bruchkobel; Walter Barthel, Langenselbold, both of Fed. Rep. of Germany

[73] Assignee: Degussa Aktiengesellschaft, Frankfurt am Main, Fed. Rep. of Germany

[21] Appl. No.: 827,719

[22] Filed: Feb. 10, 1986

[30] Foreign Application Priority Data

Feb. 14, 1985 [DE] Fed. Rep. of Germany ....... 3505051

[51] Int. Cl.⁴ .............................................. C08L 95/00
[52] U.S. Cl. .......................... 106/281 R; 106/287.34
[58] Field of Search ....................... 106/281 R, 287.34

[56] References Cited

U.S. PATENT DOCUMENTS 4,371,400 2/1983 Muller et al. ................... 106/273 R

OTHER PUBLICATIONS

Derwent Abstract Accession No. 83-62229k/26, Japanese Pat. No. J58084165, May 20, 1983.

Primary Examiner—Amelia Burgess Yarbrough
Attorney, Agent, or Firm—Cushman, Darby & Cushamn

[57] ABSTRACT

A powdered bitumen concentrate is prepared which contains a mixture of synthetic silica and crystalline, powdered synthetic zeolite or mixture of zeolites.

14 Claims, 1 Drawing Figure

PARTICLE SIZE DISTRIBUTION
(COULTER COUNTER)

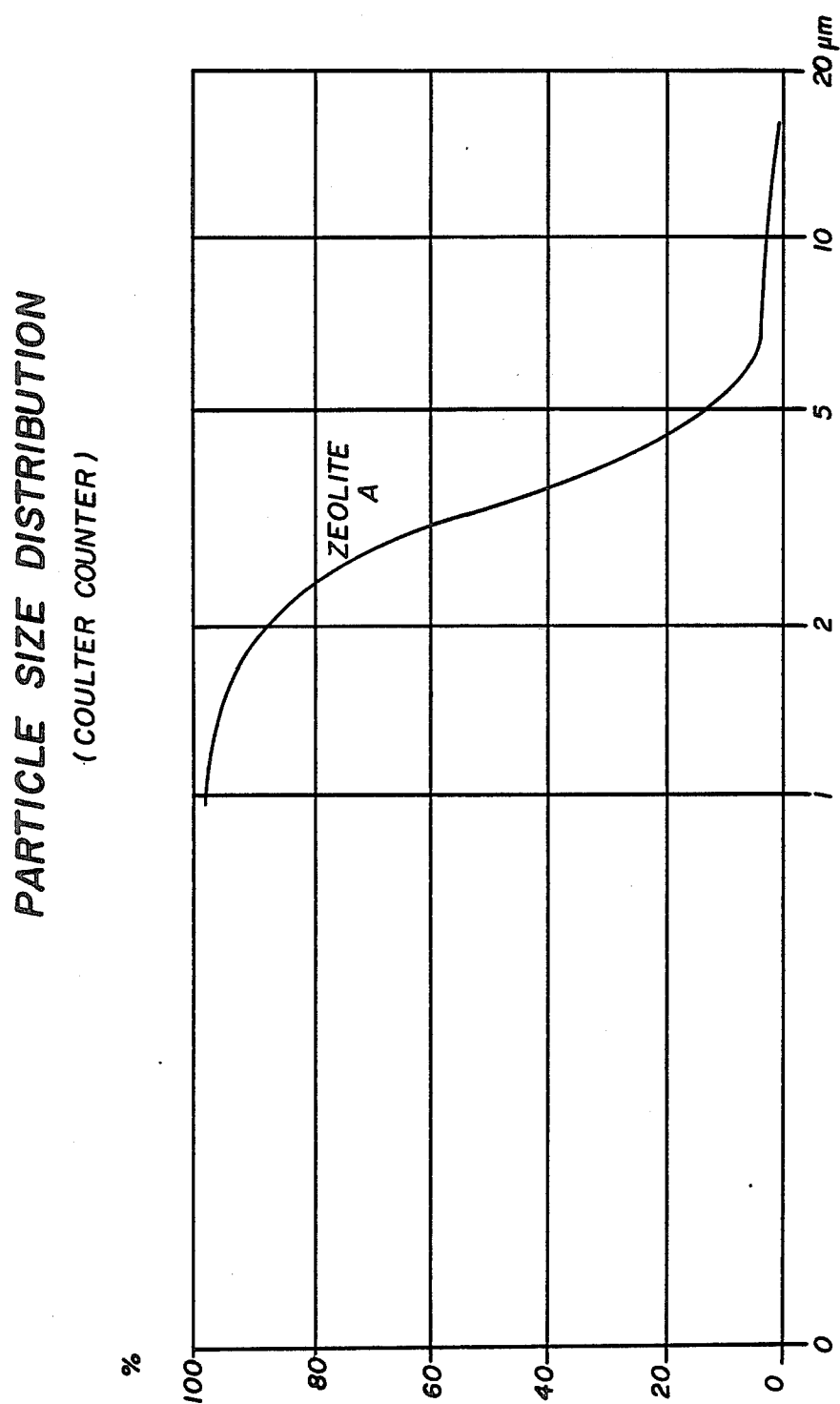

POWDERED BITUMEN CONCENTRATE AND ITS USE

BACKGROUND OF THE INVENTION

According to DIN 55946 (German Industrial Standard 55946) bitumens are a dark colored, semisolid to brittle, meltable, high molecular weight hydrocarbon mixture which are obtained in the careful working up of petroleums and the portions soluble in carbon disulfide of the natural asphalts as well as mineral wax and montan wax (see Rompp Lexikon der Chemie, 7th edition, page 377).

These types of materials which are designated in the English speaking areas (especially the USA) as asphalt are employed in admixture with powdered limestone, pulverized granite, ground basalt, ground diabase, and ground gabbro in the building of streets.

In this connection the use of natural asphalt is of especial significance. Natural asphalt can be employed in admixture with bituminous binders according to DIN 1995 to produce montan rich covering layers (e.g. cast asphalt, asphalt concrete, sand asphalt and asphalt mastic. A natural asphalt of this type is e.g. Trinidad-Epure which has the following composition:

Soluble Bitumen 53 to 55 wt. %
Mineral portion 36 to 37 wt. %
Remaining components 9 to 10 wt. %

(See Handbuch fur Strassenwesen, Planung-Bau-Verkehr-Betrieb 1979, Otto Elsner Verlagsgesellschaft, Darmstadt.)

Trinidad-Epure as well as the other known asphalts have the disadvantage that they frequently form hard, compact masses which first must be broken into small pieces in order to be homogenously miscible with the materials used as additives.

It has already been proposed to prepare asphaltite in particulate condition and to improve the flowability of the granulate through special additives.

There is known from Austrian Pat. No. 280876 a process according to which particulate asphaltite is treated with a wetting liquid, e.g. black liquor, and the finished product then sealed in air tight containers.

There are known from European Pat. No. 24513 powdered bitumen concentrates which contain in addition to bitumen 10 to 80 wt. % of synthetic silica.

SUMMARY OF THE INVENTION

The object of the invention is a powdered, flowable and temperature stable bitumen concentrate.

The subject matter of the invention is a powdered bitumen concentrate containing a mixture consisting of (or consisting essentially of) synthetic silica and crystalline, powdered synthetic zeolite or a mixture of zeolites.

The bitumen portion based on the total mixture can be 30 to 70 wt. %, preferably 45 to 55 wt. %.

The portion of synthetic silica can be 8 to 50 wt. %, preferably 15 to 20 wt. % based on the total mixture.

The portion of zeolite or zeolite mixture can be 15 to 60 wt. %, preferably 30 to 40 wt. %, based on the total mixture.

As synthetic silica there can be used precipitated silica as well as pyrogenically produced silica.

The precipitated silica can have a BET surface area of 120 to 500 $m^2/g$. Optionally they can be steam jet ground, spray dried or spray dried and ground.

The pyrogenically produced silica can have a BET surface area of 100 to 400 $m^2/g$.

As precipitated silica there can be employed a silica having the following physicalchemical data.

| | |
|---|---|
| Appearance | Loose, white powder |
| X-ray structure | amorphous |
| surface area | 170 ± 25 $m^2/g$ (according to BET) |
| Average size of The primary particles | 18 Nanometers |
| Specific weight | 2.05 g/ml |
| Degree of purity | $SiO_2$ 98% |
| | $Na_2O$ 1% |
| | $Al_2O_3$ 0.2% |
| | $SO_3$ 0,8% |
| Loss on drying[1] | 6% |
| Loss on calcining[2][3] | 5% |
| pH[4] | 6.3 |
| Solubility | practically insoluble in water |
| Characteristics | precipitated silica |
| Bulk density[5] | 200 g/Liter |
| Sieve residue according to Mocker (DIN 53 580) | 0.2 |

[1]DIN 53 198 preparation
[2]based on the material dried for 2 hours at 105° C. (DIN 55 921)
[3]DIN 52 911
[4]DIN 53 200
[5]DIN 53 194

As precipitated silica there can be employed a silica which has the same physicalchemical data and differs merely in the height of the bulk density from that mentioned above. The bulk density can be 70 g/l for example.

As a precipated and spray dried silica there can be used a silica with the following physical-chemical data:

| | | |
|---|---|---|
| Surface area according to BET | $m^2g$ | 190 |
| Average size of the primary particle | Nanometer | 18 |
| Average size of the secondary particles | Micrometer | 80 |
| Bulk density (DIN 53 194) | g/l | 220 |
| Loss on drying (DIN 55 921) (2 hours at 105° C.) | % | 6 |
| Loss on calcining (DIN 55 921 (2 hours at 1000° C.) | % | 5 |
| pH (DIN 53 200) | 6.3 | |
| $SiO_2$ (DIN 55 921)[2] | % | 98 |
| $Al_2O_3$ | % | 0.2 |
| $Fe_2O_3$ | % | 0.03 |
| $Na_2O$ | % | 1 |
| $SO_3$ | % | 0.8 |
| Sieve residue according to Mocker (DIN 53 580) | % | 0.5 |
| Oil number (according to DIN 53 199) | g/100 g | 230 |

[1]based on the material dried 2 hours at 105° C.
[2]based on the material calcined at 2 hours 1000° C.

The same precipitated and spray dried silica can also be used in the ground condition with an average size of secondary particles of e.g. 5 micrometers.

The term zeolite corresponds to the description according to D. W. Breck, "Zeolite molecular sieves", Wiley Interscience 1974, pages 133 to 180. The zeolites employed can have a water content of up to 27%.

As powdered crystalline synthetic zeolites the bitumen concentrates of the invention contain a zeolite of Type A. The zeolite A has the following general formula:

$$1.0\pm0.2M_2O.Al_2O_3.2.5\pm0.5SiO_2.YH_2On$$

wherein M is a metal cation, such as e.g. sodium or potassium cation, n its valence and y has a value up to 5.

Preferably the bitumen concentrate can contain a zeolite of Type A which is produced according to the process of German AS No. 2333068, German AS No. 2447021, German AS No. 2517218 (and related Roebke U.S. Pat. No. 4,073,867), German OS No. 2651485 (and related Strack U.S. Pat. No. 4,303,629), German OS No. 2651446, German OS No. 2651436 (and related Strack U.S. Pat. No. 4,305,916), German OS No. 2651419 (and related Strack U.S. Pat. No. 4,303,628), German OS No. 2654120 (and related Strack U.S. Pat. No. 4,303,626) and/or German OS No. 2651437 (and related Strack U.S. Pat. No. 4,303,627). The entire disclosure of the Roebke and Strack U.S. patents are hereby incorporated by reference and relied upon.

The zeolite A employed also can be produced according to other known processes, e.g. according to German patent No. 1038017 or German AS No. 1667620.

Preferably there can be employed a zeolite A having the following physical-chemical properties:

| Loss on calcining (according to DIN 55 921) | <24% |
|---|---|
| Particle distribution (Coulter-Counter) | |
| Portion | |
| <15 micrometer | 96–100 wt. % |
| <10 micrometer | 95–99 wt. % |
| <1 micrometer | <5 wt. % |

Furthermore the bitumen concentrate of the invention can contain a zeolite of Type A having the general formula:

$$0.9\pm0.2M_2O.Al_2O_3.XSiO_2.yH_2On$$

wherein M is a metal cation, such as e.g. sodium or potassium cation, n is its valency, X has a value greater than 3 and y has a value up to 9.

The zeolite Y can have the following physical-chemical properties:

| Loss on calcining (according to DIN 55 921) | <27% |
|---|---|
| Particle distribution (Coulter-Counter) | |
| Portion | |
| <15 micrometer | 96–100 wt. % |
| <10 micrometer | 85–99 wt. % |
| <1 micrometer | <20 wt. % |

These zeolite molecular sieve powders for example can be produced according to German AS No. 1098929, German AS, No. 12032329 or German AS No. 1263056.

Furthermore, the bitumen concentrate of the invention can contain as powdered zeolites a zeolite of type X having the following general formula:

$$0.9\pm0.2M_2O.Al_2O_3.2.5\pm0.5SiO_2.YH_2On$$

wherein M is a metal cation, e.g. sodium or potassium, n is its valence and y has a value up to 8.

The powdered zeolite can be produced according to German patent No. 1038016, German patent No. 1138383 or German OS No. 2028163.

The zeolite X employed can have the following physical-chemical properties:

| Loss on calcining (DIN 55 921) | <27 wt. % |
|---|---|
| Particle size distribution (Coulter-Counter) | |
| Portion | |
| <15 micrometer | 96–100 wt. % |
| <10 micrometer | 85–99 wt. % |
| <1 micrometer | 20 wt. % |

Furthermore, the bitumen concentrate can contain as powdery zeolites a zeolite of type P. The designated zeolite P is synonymous with the designation synthetic Philipsit and zeolite B. For example zeolite P can be produced according to the process of French patent 1213628 (Bayer AG).

The zeolite P employed can have the following physical-chemical properties:

| Loss on calcining (DIN 55 921) | <15 wt. % |
|---|---|
| Particle size distribution (Coulter-Counter) | |
| Portion | |
| <15 micrometer | 99–100 wt. % |
| <10 micrometer | 97–99 wt. % |
| <1 micrometer | 20 wt. % |

The bitumen concentrate of the invention furthermore can contain as powdered zeolites hydroxysodalite having the following general formula:

$$Na_2O.Al_2O_3.2SiO_2.2.5H_2O$$

Hydroxysodalite can be produced for example from zeolite A by means of boiling in aqueous soda lye (see D. W. Breck, Zeolite molecular sieves:, page 275 (1974) WileyInterscience Publication).

The hydroxysodalite employed can have the following physical-chemical properties:

| Loss on calcining (DIn 55 921) | <15 wt. % |
|---|---|
| Particle size distribution (Coulter-Counter) | |
| Portion | |
| <15 micrometer | 99–100 wt. % |
| <10 micrometer | 90–99 wt. % |
| <1 micrometer | 10 wt. % |

In a further illustrative form of the invention the bitumen concentrate of the invention can contain a mixture of the zeolites set forth. This mixture can be produced either by mixing the pure zeolites or through direct synthesis by means of a precipitation process. Mixtures which can be produced directly can be mixtures of zeolites A and P, zeolites A and X, zeolite A and hydroxysodalite, zeolites P and X or zeolites P and Y. In a preferred illustrative form the bitumen concentration can contain a mixture of zeolites X and zP in the ratio of 80 to 5:20 to 95.

A mixture of this type can be produced for example according to German OS No. 2028163, page 15, Table 3, Example 3 by means of a precipitation process.

For the production of the powdered bitumen concentrates of the invention in addition to already mentioned types of bitumen there are also suited the customary distillation bitumens as well as mixtures of distillation bitumens and products of the hard coal tar industry. According to DIN 52 00 of 1980 after the distillation of petroleum there remains as residue the distillation or street construction bitumen whose designation consists of the letter B and a number, which indicates the average penetration in 1/10 mm. The normal bitumens most used in the Federal Republic of Germany are B 25 (hard), B 45, B65, B80 and B200 (soft). Corresponding to the "Technische Lieferbedingungen fur Bindemittel auf Bitumen-und Teerbasis" (edition 1959) there can also be used further developed tar bitumens.

The bitumen concentrate of the invention can be produced by having the synthetic silica and the zeolite present in a mixer and mixing them thoroughly. The hot and liquid bitumen is allowed to flow in a thin jet while stirring the carrier components or is introduced through a nozzle or is sprayed on.

The bitumen concentrated of the invention has the following advantages:

1. simple storage in silos or sacks
2. unlimited durability
3. no susceptibility to influences of weather
4. simple dosing of bituminous masses in the process of production since no melting is required
5. use of the complete capacity of the production plants (e.g. asphalt mixing plants)
6. assurance of the complete action of the individual components, synthetic silica and zeolite
7. no dangers to health (since it is free of carcinogenic dusts and fibers)
8. no danger to the environment
9. completely oder free in hot asphalt mixes
10. in spite of the high portion of bitumen it is powdered, temperature stable and flowable.

The bitumen concentrate of the invention can be used as additive material:

(a) for the production of asphalt mixtures for binding streets and bridges (b) for the production of asphalt mixtures for above ground construction, e.g. floor pavements and industrial floor (c) for improving or reconditioning old asphalt (recycling of waste asphalt coatings and (d) for the production of bituminous building materials, such as e.g. roof paths, seam compositions, troweling compositions, roof coating compositions, insulation compositions, underground protection, corrosion protection, antisound composition.

In a special form of the invention the bitumen concentrate of the invention can be used to produce mastic asphalt.

Usable mastic asphalt mixes are described for example in European Pat. No. 48792, the entire disclosure of which is hereby incorporated by reference.

Furthermore, mastic asphalt is described in DIN 4109 Sheet 4, page 3, paragraph 5.3.5 (mastic asphalt marking) in DIN 18354 and in "Der Bundesanzeiger fur Verkehr, Technische Vorschriften und Richtlinine fur den Bau bituminoser Fahrbahndecken", part 6, page 7, edition of 1975.

Correspondingly mastic asphalt is a thick bituminous mass made of fine gravel, sand, filler and road making asphalt or road making asphalt together with natural asphalt, whose mineral mixture is low in hollow spaces. The binder content is so formulated to the hollow space of the mineral composition that these are completely filled up in the assembled condition and a slight excess of binder is present. This mixture is pourable and brushable in the hot condition and does not require any compression in asembling. The surface is post treated directly after the assembling by roughening or blunting.

There is required of mastic asphalt for street and floor pavements a high rigidity (resistance to deformation) and at the same time as good processability as possible. Since a hollow space free asphalt of this type undergoes no vibratory or roller compression there must be present a reasonable ability to be poured or smoothed. In road construction a large portion of the mastic asphalt is applied with finishers to obstructed surfaces so that even a stiff installed material can be subsequently processed. In other cases there are places where only hard construction can be carried out, such as e.g. on niches, on bridges, on ramps, with gutters, etc. Here only a pliable asphalt can be processed clearly.

There are special problems in laying mastic asphalt-industrial floors. The thickness of the coating varies between 20–40 mm, whereby unevenness of the underground must be considered. There is required a trouble-free applying of the hot asphalt compositions as well as fissure free low-resistant smoothing. The goal always is large covering capacity of the transport since in the ultimate analysis the building work is very dependent on profit. With the industrial floors of improved coating capacity there is accepted a higher material cost if in the final analysis there is a price advantage.

The stiffness of mastic asphalt compositions can have their stiffness regulated by the mineral compositions referred to (e.g. "thick" filler) or reduction in bitumen up to the mineral limit. The increased rigidity obtained thereby in any case is a load on the coating capacity. It can be more significant to strive for a higher resistance to deformation or a lower depth of penetration and simultaneously a good pliability by effective additives.

The addition of precipitated silica alone to the mastic asphalt composition leads to a reduction of the depth of penetration, i.e. to an increase of the stability to deformation. Simultaneously the processing temperature must be increased around 20° C. which indicates a reduction of the ready processability of the mastic asphalt.

If crystalline synthetic zeolite is added to the asphalt mixture then there is reduced the depth of penetration and the processing temperature.

If there is added precipitated silica and crystalline, synthetic-zeolites to the mastic asphalt composition then the depth of penetration is clearly lowered, however, the processing temperature is only increased insignificantly. With a change of the ratio of precipitated silica and crystalline synthetic zeolite the temperature can be corrected. This means that zeolite in increased addition leads to more pliable mastic asphalt compositions, independently there is attained an increase of the form stability, the combination of precipitated silica however, brings about the clearest industrial construction advantage within the series of experiments.

The stiffening stability which is undesirable for the ready processability (plasticity, spreading) smoothness resulting from the addition of precipitated silica is removed through the dehydrating zeolites, whereby a brushable composition is maintained for a certain time span. The cooled paving, however, then after the end of all processing shows a smaller depth of penetration or an increased resistance to deformation whereto the zeolite itself contributes to the improvement. The combined use of precipitated silica and crystalline, synthetic zeolites leads to a mastic asphalt of improved stability and therewith to improved load carrying. This higher resistance to deformation is desired in building streets in special uses. Special coatings are used on bridges, highly used traffic crossings, ramps, etc. Industrial floors require high load carrying. Factory and storage sheds are expected to receive shelves palettes, machines, etc. The large loads are frequently transported on the floor only over small pressure areas (standing shelves). Undesired indentations are the result. Travelling takes place with fork-lift trucks and other powered vehicles which deliver strong loads to the floor and therewith leave tracks behind.

It is especially advantageous that the improvement of the stability of the mastic asphalt in using the combined additives silica/zeolite does not result in increasing the processability difficulties. Reduced $m^2$-capacity of the portable columns are not desired since with the high portion of costs they negatively effect the final price of the laid floor.

The powdered bitumen concentrate of the invention is explained and described in more detail in the following examples.

The composition of the invention can comprise, consist essentially of, or consist of the stated materials.

BRIEF DESCRIPTION OF THE DRAWING

The single FIGURE of the drawing is a graph of the particle size distribution of a zeolite useful in the invention.

DETAILED DESCRIPTION

For the production of powdered bitumen concentrate in the laboratory there was carried out the following sequence of operations.

1. Heating the respective silica, zeolite, and bitumen to 140° C. in the drying cabinet.
2. The weighed out amounts of silica and zeolite are present in the mixing container. Portionwise addition of bitumen with stirring (by hand or with wing stirrer, depending on the amount), vigorous subsequent mixing up to visible homogenization.
3. Applying the still hot composition to a metal sheet, distribution until cooled to room temperature.
4. The cold, friable to granular composition is hammered and ground in a Braun-Cake mixer for about 30 seconds.
5. The powder is placed on a 0.75 mm sieve, sieved, homogenized in a glass container in a Turbula mixer.

As zeolite there was used a zeolite of type A (Wessalith ® of Degussa AG) which was was produced according to German OS No. 2651436 (and related Strack U.S. Pat. No. 4,305,916) and has the particle spectrum of FIG. 1.

As synthetic silica there was employed the silica Sipernat 22 ® of Degussa AG.

Silica Sipernat 22 ® is a precipitated and spray dried silica having the following physical-chemical properties:

| | | |
|---|---|---|
| Surface area according to BET | $m^2/g$ | 190 |
| Average size of the primary particles | Nanometer | 18 |
| Average size of the secondary particles | Micrometer | 80 |
| Bulk density (DIN 53 194) | g/l | 220 |
| Loss on drying (DIN 55 291) (2 hours at 105° C.) | % | 6 |
| Loss on calcining (DIN 55 921) | % | 5 |

-continued

| | | |
|---|---|---|
| (2 hours at 1000° C.) | | |
| pH (DIN 53 200) | | 6.3 |
| SiO$_2$ (DIN 55 921)[3] | % | 98 |
| Al$_2$O$_3$ | % | 0.2 |
| Fe$_2$O$_3$ | % | 0.03 |
| Na$_2$O | % | 1 |
| SO$_3$ | % | 0.8 |
| Sieve residue according to Mocker (DIN 53 580) | % | 0.5 |
| Oil number (according to DIN 53 199) | g/100 g | 230 |

[1]based on the material dried for 2 hours at 105° C.
[2]in water: acetone or methanol 1:1
[3]based on the material lacined for 2 hours at 1000° C.
[4]contains about 2% chemically bound carbon SIPERNAT 22   17 wt. %
WESSALITH P   33 wt. %
BITUMEN B 65   50 wt. %

Product Description: dry, flowable and pourable, medium to black brown or grey powder

| Bulk density | 0,50–0.70 [kg/l] |
|---|---|
| Particle distribution | |
| 0–0.09 mm | 2–4 wt. % |
| 0.09–0.2 mm | 20–35 wt. % |
| 0.2–0.4 mm | 10–25 wt. % |
| 0.4–0.8 mm | 15–30 wt. % |
| 0.8–1.0 mm | 4–12 wt. % |
| 1.0–2.0 mm | 10–20 wt. % |
| 2.0 mm | 2–8 wt. % |

The entire disclosure of German priority application P No. 3505051.9 is hereby incorporated by reference.

What is claimed is:

1. A powdered bitumen concentrate containing a mixture consisting of bitumen, synthetic silica and at least one synthetic zeolite.

2. A powdered bitumen concentrate according to claim 1 wherein the synthetic silica is pyrogenic silica or precipitated silica.

3. A powdered bitumen concentrate according to claim 2 wherein the synthetic silica is precipitated silica.

4. A powdered bitumen concentrate according to claim 1 wherein the bitumen is 30 to 70 wt. % based on the total mixture.

5. A powdered bitumen concentrate according to claim 1 wherein the bitumen is 45 to 55 wt. % based on the total mixture.

6. A powdered bitumen concentrate according to 4 wherein the synthetic silica is 8 to 50 wt. % based on the total mixture.

7. A powdered bitumen concentrate according to claim 6 wherein the synthetic silica is 15 to 20 wt. % of the total mixture.

8. A powdered bitumen concentrate according to claim 5 wherein the synthetic silica is 15 to 20 wt. % of the total mixture.

9. A powdered bitumen concentrate according to claim 4 wherein the zeolite is 15 to 60 wt. % of the total mixture.

10. A powdered bitumen concentrate according to claim 9 wherein the zeolite is 30 to 40 wt. % of the total mixture.

11. A powdered bitumen concentrate according to claim 5 wherein the zeolite is 30 to 40 wt. % of the total mixture.

12. A powdered bitumen concentrate according to claim 6 wherein the zeolite is 15 to 60 wt. % of the total mixture.

13. A powdered bitumen concentrate according to claim 7 wherein the zeolite is 30 to 40 wt. % of the total mixture.

14. A powdered bitumen concentrate according to claim 8 wherein the zeolite is 30 to 40 wt. % of the total mixture.

* * * * *